Patented May 7, 1940

2,199,936

UNITED STATES PATENT OFFICE 2,199,936

HYPOCHLOROUS ACID SOLUTIONS AND METHOD OF MAKING SAME

Hans O. Kauffmann, Buffalo, N. Y., assignor to Buffalo Electro - Chemical Company, Inc., Buffalo, N. Y.

No Drawing. Application February 10, 1937, Serial No. 125,114

5 Claims. (Cl. 23—152)

This invention relates to hypochlorous acid solutions and particularly to solutions of hypochlorous acid possessing substantially no odor.

Hypochlorous acid has long been suggested as a bleaching agent for various types of materials but has been used but little in commercial operations, alkaline solutions of salt of hypochlorous acid being preferred for the reason that the acid as made is extremely odorous, emitting chlorine, even small amounts of which are extremely irritating to mucous membranes, and therefore harmful to workers exposed to these fumes.

The methods heretofore suggested for the preparation of hypochlorous acid were either the passage of gaseous chlorine into water or acidification of hypochlorites. In both cases excessive fumes attended the manufacture and use of the acid solution.

It is an object of the present invention to provide a solution containing hypochlorous acid which is free of the gaseous exhalations heretofore associated with such solutions and to eliminate the occupational hazard attendant upon the commercial use thereof.

It is a further object of the present invention to provide a method for the manufacture of solutions of odorless hypochlorous acid.

In accordance with the procedures of the present invention a compound containing the phosphate radical is added to an aqueous solution of an alkali or alkaline earth metal hypochlorite or other metal hypochlorite soluble or slightly soluble in water and a strong inorganic acid, such as sulfuric acid, added carefully until the solution is acid but does not show a pH value of less than about 4.5.

Thus, bleaching powder or the so-called high test hypochlorites, the active ingredient of which is calcium hypochlorite, may be dissolved in water and a small quantity of a soluble phosphate such as phosphoric acid added and acid added until the acidity expressed as pH values is less than 7 but greater than about 4.5. It will be noted that the resulting solution is substantially inodorous when acid and at pH values above about pH 4.5, but as soon as the acid concentration is increased and the pH value becomes less than about 4.5 substantial quantities of chlorine or chlorous oxide or both are evolved and make the solution extremely undesirable to work with.

In another mode of operation chlorine gas may be passed into an alkaline hypochlorite solution having a compound therein containing a phosphate radical until the solution becomes acid but in which the pH value is not permitted to drop below about pH 4.5. As this range of pH is very slight, it is somewhat difficult to manufacture the solution by this procedure as the chlorine gas is dissolved in the aqueous solution saturating the same and this free element gradually reacts with the water to produce hypochlorous acid and the much stronger hydrochloric acid. Therefore, when it is desired to use chlorine gas, it is preferred to introduce somewhat less than the theoretical quantity to react with the alkali present and then adjust the pH value to an acid value between 4.5 and 7 with an acid like sulfuric acid.

In another mode of operation an alkaline hypochlorite is mixed with a soluble acid phosphate such as monocalcium phosphate, the so-called superphosphate and the pH value adjusted to an acid value between 7 and 4.5 by the use of a strong inorganic acid, preferably sulfuric acid. As an example of this mode, three grams of a commercial high test calcium hypochlorite containing 70% of active chlorine are dissolved in one liter of water. Upon addition of three grams of superphosphate, 45% $P_2O_5$, a very voluminous precipitate is produced. A pH value of approximately 5.5 is produced in the solution by the addition of about 1 cubic centimeter of concentrated sulfuric acid. As the acid is added the precipitate goes into solution and at a pH of 5.5 the larger portion of the precipitate has disappeared. Upon addition of a very small quantity of additional acid all the precipitate dissolves at pH values below 4.5 and a marked odor of chlorine and hypochlorous acid is apparent. The above solution having a pH value of 5.5 may be used directly for bleaching whenever acid hypochlorites have been suggested heretofore as bleaching agents or the precipitate may be removed prior to use.

What is claimed is:

1. The method of manufacturing hypochlorous acid which comprises acidifying a mixture of a phosphate and a hypochlorite and adjusting the pH value of the resultant solution with a mineral acid to less than 7 and above about 4.5.

2. The method of manufacturing hypochlorous acid which comprises acidifying a mixture of a phosphate and a hypochlorite and adjusting the pH value of the solution to less than 7 and above about 4.5.

3. The method of manufacturing hypochlorous acid which comprises mixing a metal phosphate with a metal hypochlorite in aqueous solution and then acidifying the resultant solution with sulfuric acid to a pH value of less than 7 and above about 4.5.

4. An acidic aqueous solution containing hypochlorous acid, a phosphate and a mineral acid and having a pH value of greater than about 4.5.

5. An acidic aqueous solution containing hypochlorous acid and a phosphate and having a pH value greater than about 4.5.

HANS O. KAUFFMANN.